UNITED STATES PATENT OFFICE.

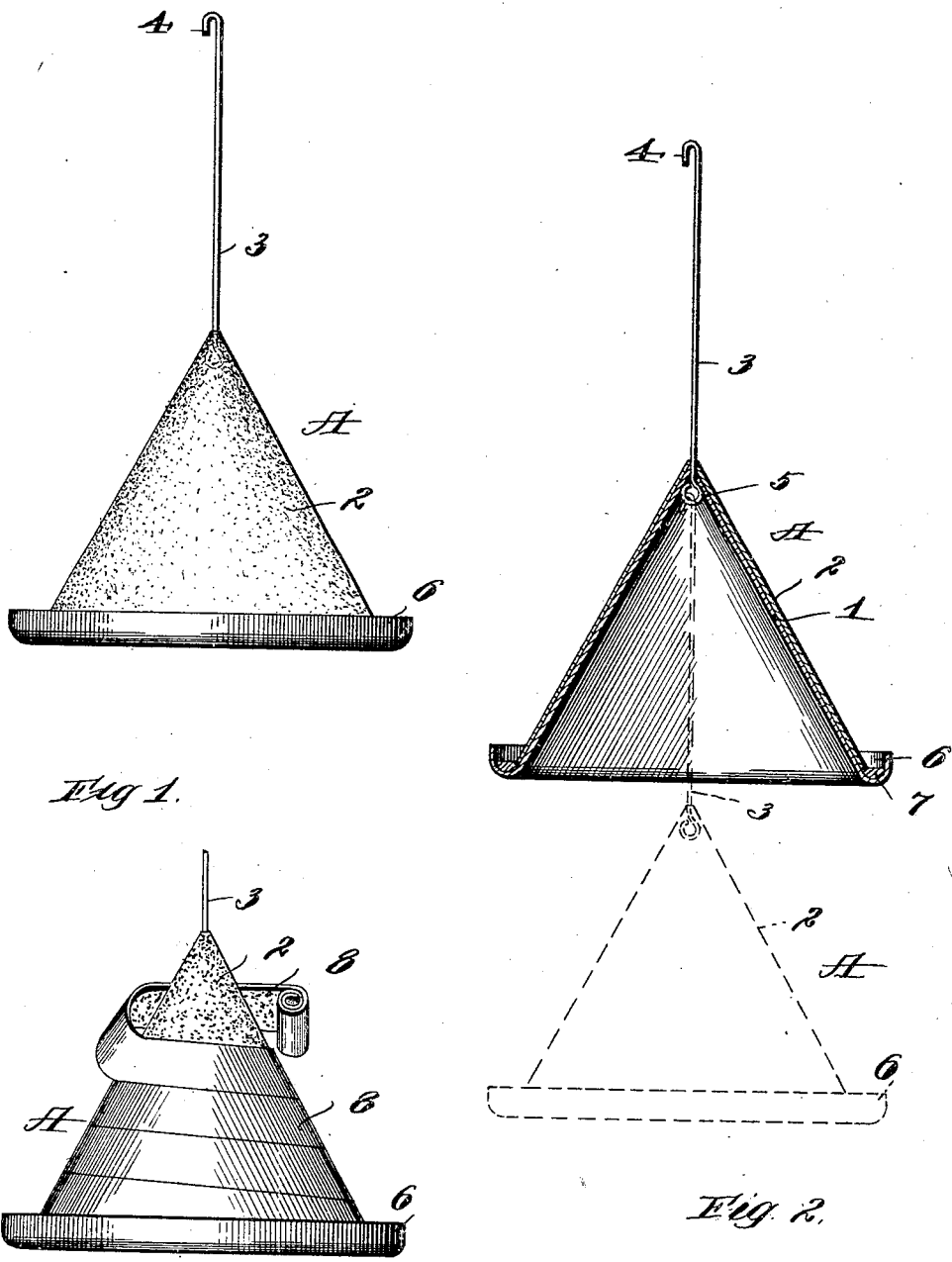

CHARLES J. ROSS, OF OAKLAND, CALIFORNIA.

STICKY FLY-PAPER.

954,887.  Specification of Letters Patent.  Patented Apr. 12, 1910.

Application filed October 12, 1908. Serial No. 457,301.

*To all whom it may concern:*

Be it known that I, CHARLES J. ROSS, a citizen of the United States, and a resident of Oakland, Alameda county, California, have invented certain new and useful Improvements in Sticky Fly-Paper, of which the following is a specification.

This invention relates to sticky fly paper.

The object of my invention is to provide sticky fly paper designed and adapted to be hung in suitable conspicuous places, as in windows or from ceilings, where they will readily attract flies and other insects, but will be removed from accidental and unintentional contact with other objects, the surface of said paper which is coated with a sticky mixture being inclined to present a convex surface so as to form a natural lighting place for flies, etc.

My invention also consists of the various other features and details hereinafter described and claimed.

In the accompanying drawing, in which my invention is fully illustrated—Figure 1 is a side view of a sheet of fly paper of my invention. Fig. 2 is a central, vertical, sectional view thereof, a second sheet being shown in dotted lines to illustrate the manner of suspending my improved sheets in series; and Fig. 3 is a side view of a sheet of fly paper of my invention, the exposed coated surface thereof being covered with a suitable envelop.

Referring now to the drawing, in which A designates, as a whole, a sheet of sticky fly paper of my invention, 1 designates a structure, preferably made of paper of suitable weight, strength and texture, the sides of which are convexly inclined from its edges to its center, so that the exterior surface thereof will be prominently exposed and will form a natural lighting place for flies and other insects and, also, bringing the center of gravity thereof below the apex or center thereof, so that, when suspended from its apex or center, said sheet will be stable and, under ordinary conditions of use, stationary.

As shown, the structure 1 is conical in shape, but the objects of my invention may be attained equally well and my invention therefore contemplates any other form of structure the outer surface of which is convexly inclined. The exterior surface of the sheet 1 is coated with a sticky mixture, indicated at 2, my invention contemplating the use of any desired or approved sticky mixture, such as is now in common use. The structure 1 is designed to be suspended, preferably in a light, exposed place, as in a window or from the ceiling of a room, where it will readily attract flies and other insects, but will be removed from accidental contact. As shown, said structure 1 is adapted to be thus suspended by means of a string or wire 3 which passes through a suitable hole or opening formed in the apex or center of said structure, a loop or hook 4 being formed on its upper end and an enlargement 5 at its lower end, which will prevent said string or wire from pulling through the hole in said sheet 1.

To prevent the sticky mixture 2 from running down and dripping off from the edge of the structure 1, a trough 6 is formed around the edge thereof, preferably by turning up the edge thereof. If desired, the trough 6 may be coated or partially filled with beeswax, paraffin, or other material impermeable to the sticky mixture, shown at 7, which will prevent the sticky mixture which settles into said trough from soaking into the material forming the same, which might operate to soften and weaken the same so that it would turn down or straighten out either under its own weight or in handling.

My invention contemplates suspending the sheets A either singly, as shown in Fig. 1, or in series, one below the other, as indicated in Fig. 2, in which a second sheet of fly paper is shown in dotted lines suspended from the first. Convenient means for thus suspending said sheets of fly paper in series consists in forming the enlargement 5 at the lower end of the wire 3 in the form of an eye or hook with which the hook 4 of the suspending wire 3 of the lower sheet may be conveniently engaged. Where string is used for suspending said sheets, the strings of the lower sheets may be tied directly to the depending ends of the sheets immediately above them.

In shipping my improved sticky fly paper, I contemplate "nesting" them one within the other, and to prevent adjacent sheets from sticking together, the exposed coated surface of each sheet is covered with what may be appropriately termed an envelop, consisting preferably of paraffin paper, which may be readily removed to expose the sticky coating of the sheets, when they are desired for use. Said envelop will also prevent drying out of the sticky coating, thus preventing deterioration of the paper. While my invention contemplates any desired or approved form of envelop for thus covering the coated surfaces of the sheets, I prefer the form shown in Fig. 3 of the drawing, which consists of a strip 8 of suitable material, preferably paraffin paper, wound spirally around the coated surface of the sheets A. Said strips 8 may be of any desired width, a convenient width for most purposes being about three inches. I consider this form of envelop preferable for the reason that said strips may be conveniently removed, preliminary to using paper, without soiling the hands, by rolling them inwardly as they are stripped off, thus covering the surfaces thereof which were in contact with the coated surfaces of the sheets A.

I claim:—

1. As a new article of manufacture, sticky fly paper consisting of a hollow structure the outer surface of which is convexly inclined from its edges to its center, a coating of sticky mixture on the exposed convex surface of said structure and a removable envelop for covering the coated surface of said paper to provide for "nesting" said sheets in shipping.

2. As a new article of manufacture, sticky fly paper consisting of a hollow structure the outer surface of which is convexly inclined from its edges to its center, a coating of sticky mixture on the exposed convex surface of said structure and a removable envelop for covering the coated surface of said paper to provide for "nesting" said sheets in shipping, said envelop consisting of a strip of suitable material wound spirally on the exposed convex surface of said paper.

In testimony, that I claim the foregoing as my invention, I affix my signature in presence of two subscribing witnesses, this third day of October, A. D. 1908.

CHARLES J. ROSS.

Witnesses:
 ADELLE H. ROSS,
 JULIA VILLEGAS.